Jan. 29, 1963 N. D. MORGAN 3,075,716

HIGH SPEED BRAKE

Filed May 15, 1959 4 Sheets-Sheet 1

INVENTOR.

NORMAN D. MORGAN

BY

Christie, Parker & Hale

ATTORNEYS.

INVENTOR.
NORMAN D. MORGAN
BY
Christie, Parker & Hale
ATTORNEYS.

Jan. 29, 1963 N. D. MORGAN 3,075,716

HIGH SPEED BRAKE

Filed May 15, 1959 4 Sheets-Sheet 3

INVENTOR.
NORMAN D. MORGAN

BY Christie, Parker & Hale
ATTORNEYS.

INVENTOR.
NORMAN D. MORGAN
BY
Christie, Parker & Hale
ATTORNEYS.

United States Patent Office 3,075,716

Patented Jan. 29, 1963

3,075,716
HIGH SPEED BRAKE

Norman D. Morgan, Arcadia, Calif., assignor to Burroughs Corporation, Detroit, Mich., a corporation of Michigan Filed May 15, 1959, Ser. No. 813,537
6 Claims. (Cl. 242—55.12)

This invention relates to brakes and more particularly to brake apparatus for high speed magnetic tape transports.

Magnetic tape apparatus employed in such high speed applications as digital computers function to transport tape past a magnetic transducer at a substantially constant linear speed. The magnetic tape may be transported at the required high speeds by reel to reel operation. Since the transport reels are driven at different speeds to maintain the constant linear speed in transporting the tape past the transducers, it has been customary to transport the tape through a vacuum column. The vacuum column is arranged between the reels in a manner to serve as a reserve of tape to correct for any errors in the rotational speeds of the reels whereby any undesired tension or slack in the tape is avoided.

Operating the tape apparatus at high speeds in this fashion necessitates a safety device or brake to preserve the tape in the event of a power failure to the drive motors for the reels. In the event of the loss of power to the drive motors the amount of tape wound or unwound from any one reel may be excessive so as to cause the breakage of the tape or to unwind an excessive amount of tape. This unreliable operation of the magnetic tape apparatus would then render the operation of the associated equipment or digital computer unreliable. These malfunctions, in addition, will cause either loss of information on the tape or erroneous operation of the associated equipment. Accordingly, it is desirable to provide a brake for magnetic tape apparatus to prevent malfunctions of the above type. The brake, however, for use with high speed operating tape transports must have the essential feature of responding very quickly, bringing the tape apparatus to a halt within a very short time after a malfunction is sensed without any damage to the tape. This high speed operation must necessarily be provided by a brake that is compatible in size, weight and expense with the associated tape apparatus.

This invention provides a high speed operating brake for use with magnetic tape transports which is relatively compact, inexpensive and easy to manufacture. The brake is actuated by a self-contained power source in response to the sensing of a malfunction in the tape transport within a very short time interval to prevent any possible damage to the magnetic tape. The actuation of the brake to stop the tape transport is independent of the power source for the transport proper.

The tape transport of this invention employs a pair of reels mounted to transport the tape back and forth between the reels through a pair of vacuum columns adapted to loosely receive the tape. The reels are independently driven and controlled by individual drive motors coupled to the shafts for the reels. The reels further include a brake drum mounted for rotation with the drive motors and which brake drums are provided with brake bands encircling each of the drums. The brake bands are normally arranged in frictional engagement with the brake drums to prevent the rotation of the driving shafts and thereby the transporting of the tape between the reels. The braking position of the brake bands are controlled by a combination of a pair of brake arms and links operatively connected with a low inertia latch mechanism for actuating the brake bands.

The brake arms are spring biased to normally maintain the brake bands in braking engagement with the drums and are caused to disengage the brake drums by the operation of the latch mechanism against the force of the springs.

The latch mechanism for the links is under the control of electro-mechanical switching means and which switching means is positioned into engagement with the links to cause the brake bands to loosely encircle the brake drums to allow the tape to be transported between the reels. The actuation of the latch mechanism in this fashion results through the provision of motor means operative for a preselected time interval to operate the electro-mechanical switching means whereby the latch is locked into position when the tape apparatus proper is ready to transport tape. The vacuum columns through which the tape is transported includes means for sensing any malfunction of the tape passing therethrough and which means controls both the operation of the motor means and the electro-mechanical switching means. Accordingly, the tape may not be transported unless the sensing means initiates the operation of the motor to disengage the brake bands or in the event of a malfunction during the transporting of the tape it operates the latch mechanism whereby the stored energy of the springs function to cause the brake bands to grip the drums and bring the reels to an immediate halt.

These and other features of this invention may be more fully appreciated when considered in the light of the following specification and drawings, in which.

Figure 1:
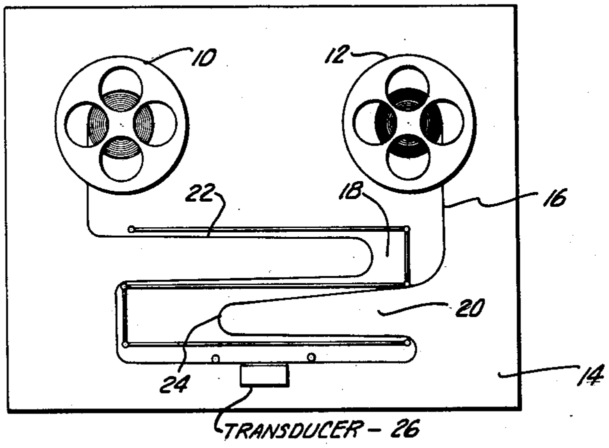
FIG. 1 is a front elevational view of tape apparatus utilizing the invention.

Now referring to the drawings, the invention will be described in more detail. The tape apparatus includes a pair of reels 10 and 12 mounted on the front of a panel 14. The reels 10 and 12 mount a magnetic tape 16 and alternately function as supply and take-up reels for the tape which is transported between the reels through a pair of vacuum columns 18 and 20. The magnetic tape 16 is passed through the vacuum columns 18 and 20 whereby the tape loops 22 and 24 are respectively formed therein. The magnetic tape 16 is also transported past a transducer 26, shown located adjacent the bottom edge of the vacuum column 20 as it travels between the vacuum columns 18 and 20. It will be recognized that information may be extracted from or added to the magnetic tape 16 as it passes by the transducers 26. The vacuum columns 18 and 20 are arranged with sensing means (not shown) to sense the two extremes of the tape 16 in the vacuum columns 18 and 20, as well as being responsive to any breakage of the tape to signal a reel braking action. The sensing means may conveniently comprise diaphragm type switches incorporated adjacent either end of the vacuum columns 18 and 20.

The shafts mounting the reels 10 and 12 extend through the panel 14 and are coupled to individual drive motors, shown in block form and identified by the reference characters 28 and 30. These drive shafts further include brake drums 32 and 34 coupled intermediate the drive belts for the motors 28 and 30 and the back face of the panel 14. The drive motors 28 and 30 are independently controlled to alternately and selectively wind and unwind the magnetic tape 16 onto one reel and off the other.

Figure 3:
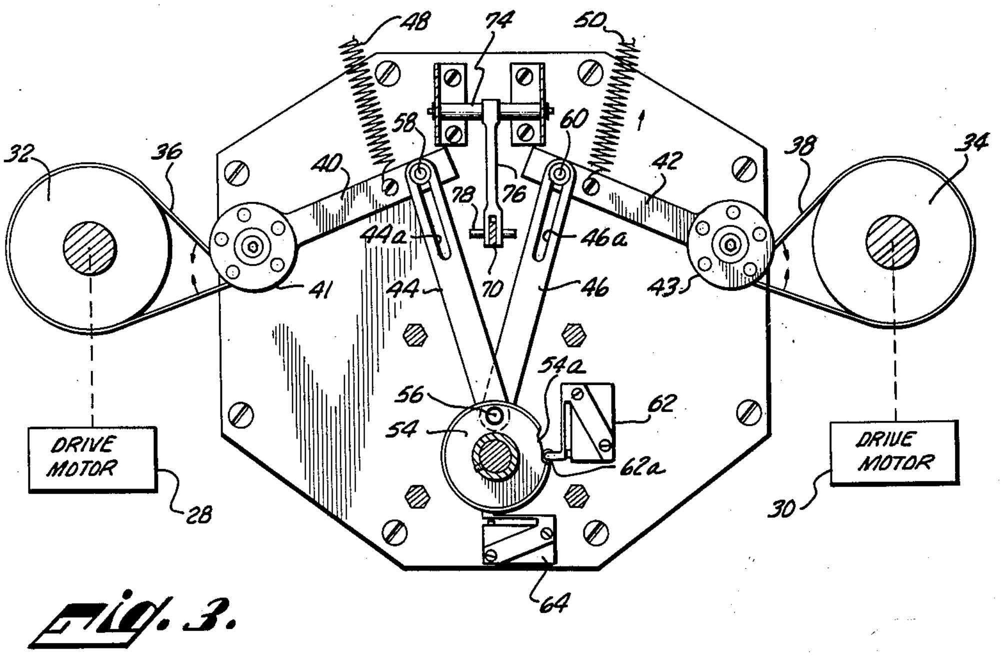
FIG. 3 is an elevational view of the brake of FIG. 2 detached from the tape apparatus and illustrating the engaged position of the brake.
Figure 2:
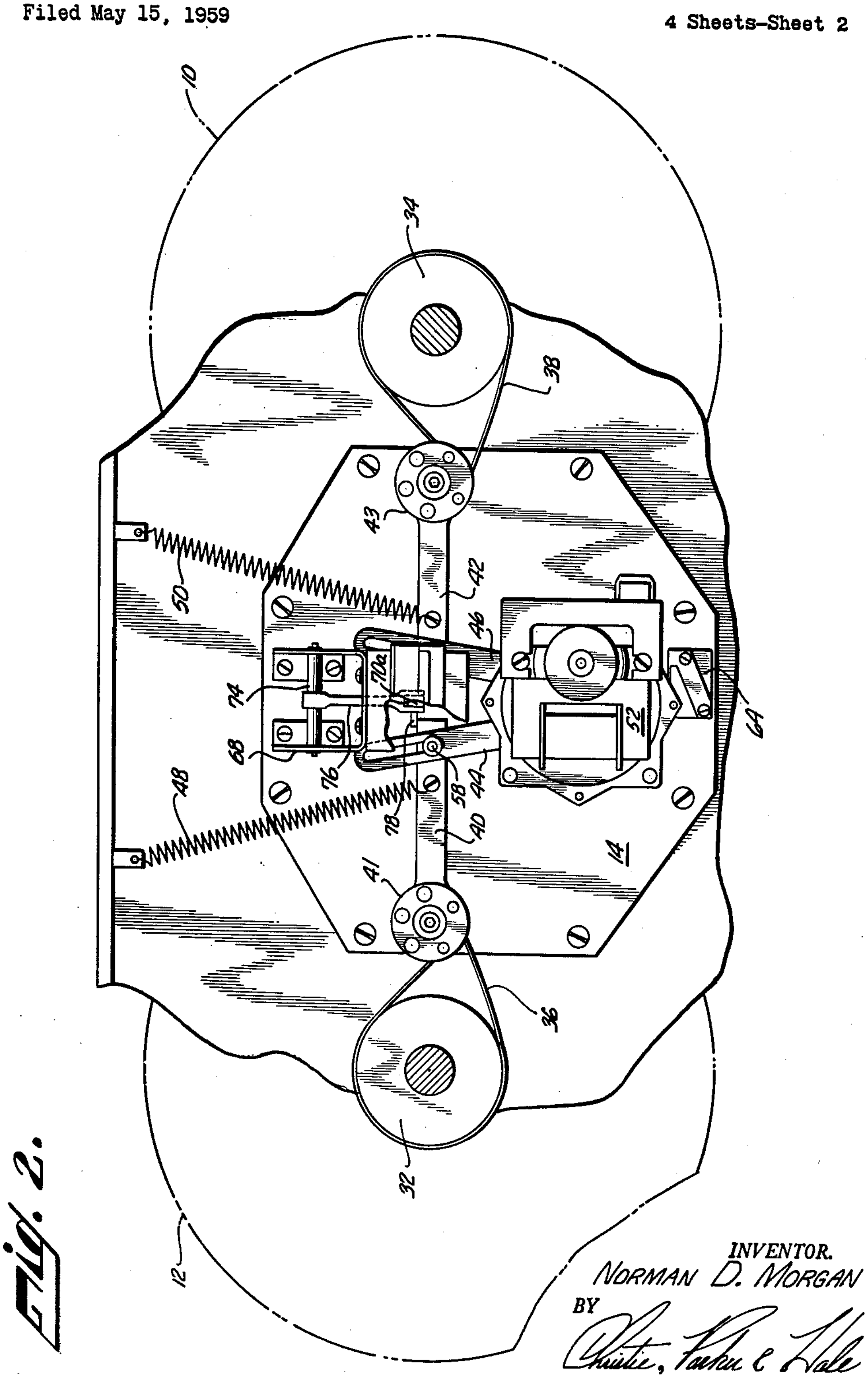
FIG. 2 is a rear elevational view of the tape apparatus of FIG. 1 illustrating an embodiment of the invention with the latch mechanism holding the brake disengaged.

The brake of this invention is coupled to each of the brake drums 32 and 34 to quickly stop the reels 10 and 12 upon sensing any one of the malfunctions described above. To this end the brake drums 32 and 34 are provided with individual brake bands 36 and 38 arranged thereon and normally frictionally engaging the drums in a braking relationship. The brake bands 36 and 38 are selectively positioned into and out of braking relationship with their respective drums 32 and 34 through the provision of individual braking control arms 40 and 42 provided with the band securing drums 41 and 43 adjacent one end thereof. The drum 41 is connected to the brake control arm 40 while the drum 43 is connected to the brake control arm 42. The brake bands 36 and 38 are respectively connected to the drums 41 and 43 adjacent the lower ends thereof to cause the bands to tightly engage the drums when the brake arms are in a "zero" position as illustrated in FIG. 3. The position referred to as "zero" is the braking position of the brake. The opposite ends of the brake arms 40 and 42 operatively cooperate with the links 44 and 46 loosely connected thereto. The brake arms 40 and 42 are spring biased by a pair of tension springs 48 and 50 respectively mounted between the arms 40 and 42 and the top of the panel 14. The springs 48 and 50 are constructed and arranged to urge the adjacent ends of the brake arms 40 and 42 upwardly as shown to place the brake bands 36 and 38 into a braking relationship.

The links 44 and 46 are provided with longitudinal slots $44^a$ and $46^a$ to allow the links to follow the rotational motion provided by a control motor identified by the general reference character 52. The motor 52 is a commercially available unit from the Molon Motor and Coil Co., Chicago, Illinois, and includes a brake for fast starting and stopping thereof. The motor shaft is provided with a crank hub 54 connected to be rotatable therewith. The free ends of the links 44 and 46 are connected together to the hub 54 by a securing pin 56. The pins 58 and 60 are attached to an inner portion of control arms 40 and 42 and links 44 and 46 are arranged such that pins 58 and 60 slidably engage longitudinal slots $44^a$ and $46^a$ and in this fashion are responsive to the rotation of the hub 54 whereby the links are guided, as a result, to move longitudinally for placing the brake arms in a substantially horizontal position to disengage the brake.

The hub 54 is further defined with a camming notch $54^a$ adapted to receive a roller $62^a$ for the motor run and motor stop switches, identified by the single reference character 62. The switch 62 is positioned adjacent the hub 54 whereby the roller therefor is received within the notch $54^a$ to maintain the switches normally de-energized when the brake is in the "zero" position. The hub 54 is further arranged with a switch 64 arranged 180 degrees from the securing pin 56 when it is in the "zero" position. The function of the switches 62 and 64 will be described in more detail hereinafter. It suffices to say at this time, that these switches cooperate in the electrical circuit means for actuating a solenoid 66 arranged in this circuit.

Figure 5:
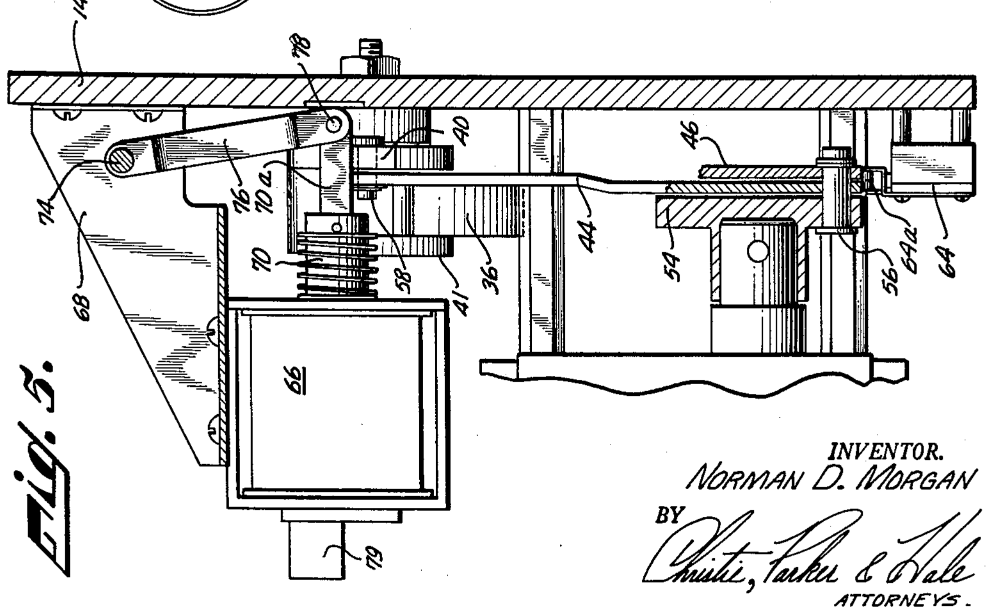
FIG. 5 is a sectional view taken along the line 5—5 of FIG. 4.

The solenoid 66 is mounted to the panel 14 by means of a bracket 68 secured thereto adjacent the top of the panel, as best seen in FIG. 5. The plunger 70 including a link $70^a$ for the solenoid 66 is coupled to a low inertia latch 72. The latch 72 comprises a shaft 74 rotatably mounted to a pair of spaced arms defined on the supporting bracket 68 for the solenoid 66. The shaft 74 mounts an arm 76 centrally arranged thereon and which arm has a bifurcated end with a pin 78 coupling the arm to the plunger 70 for the solenoid. The pin 78 extends outwardly of the ends of the arm 76 and the plunger 70 whereby when the solenoid 66 is energized the pin 78 engages the ends of the brake arms 40 and 42 to oppose the force of springs 48 and 50 to prevent the brake control arms 40 and 42 from assuming the braking position.

The solenoid 66 also mounts a pressure responsive switch 79 at the opposite end of the solenoid from the latch 72. The switch 79 comprises a pair of switch elements $79^a$ and $79^b$ arranged thereon to be responsive to the actuating pressure provided by the withdrawn solenoid plunger 70 upon energization of the solenoid winding. The switch 79 is arranged with the switch contacts $79^a$ normally closed or in engagement when the solenoid winding is de-energized and which contacts are in electrical series circuit relationship with the motor 52 and operating switches 80 and 82 to be described in more detail hereinafter. The switch contacts $79^b$ are normally open or disengaged while the solenoid winding is de-energized and are caused to engage one another upon energization of the solenoid in response to the pressure of the solenoid plunger 70 and which plunger also simultaneously actuates the movable contact of the contacts $79^a$ to cause them to disengage.

Figure 6:
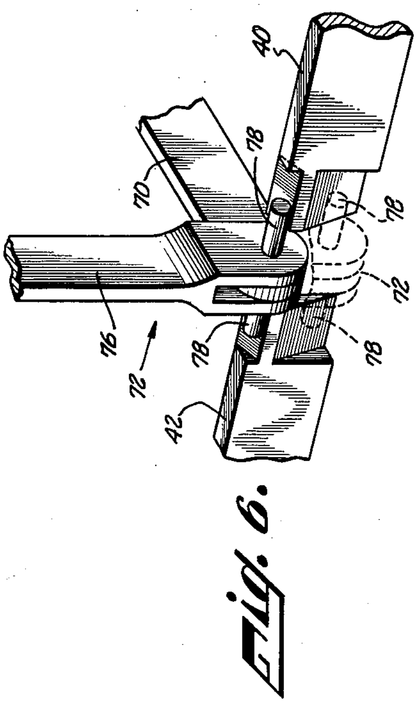
FIG. 6 is an enlarged view showing the inter-relationship of the latch and brake arms.

A feature of this invention which renders the brake fast acting is the provision of the friction angle for the brake arms 40 and 42, shown in FIG. 6. The brake arms 40 and 42 are further defined with their edges tapered adjacent the pin 78 for seating same. The ends of the arms 40 and 42 are tapered to define the friction angle to cause the quick release of the pin 78 from engagement with the arms 40 and 42 upon sensing a malfunction and signalling a braking action.

Figure 7:
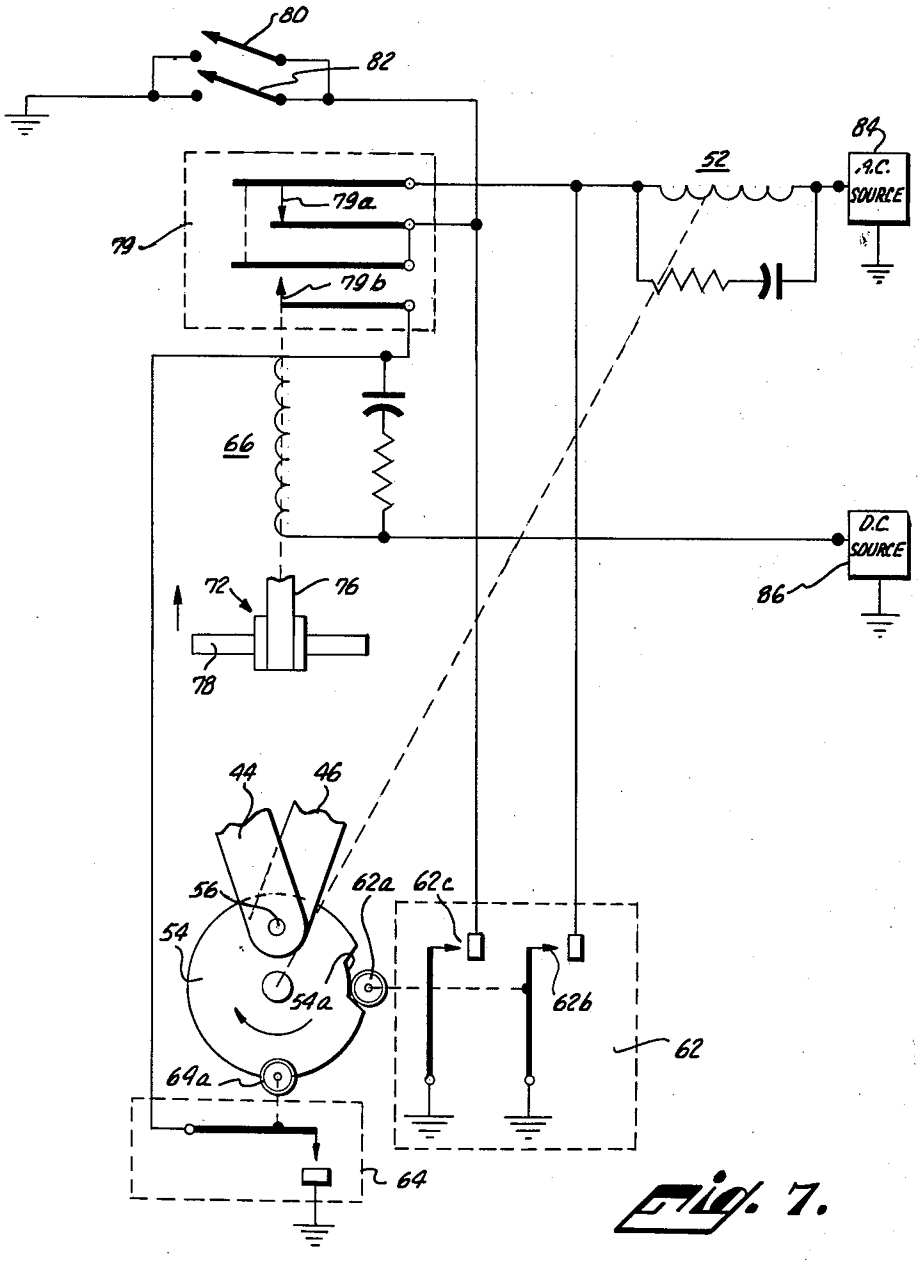
FIG. 7 is a schematic circuit diagram of the control circuit for the brake.

With the above structure in mind, the operation of the brake will now be considered with particular reference to the circuit diagram of FIG. 7. The circuit diagram of FIG. 7 includes the manually operated switch 80 connected in parallel circuit relationship with the switch 82 which is also shown as a manually operated switch merely for convenience in illustration thereof. The switch 82, however, is automatically actuated in response to the above-mentioned sensing means associated with the vacuum columns 18 and 20. The motor 52 is shown in the circuit diagram as connected to a source of alternating current power 84 having one terminal connected to ground. The motor winding is also connected in series circuit relationship with the normally closed switch contacts $79^a$. The normally closed contact $79^a$ for switch 79 is connected through the switches 80 and 82 to ground, while the normally open contacts $79^b$ for the switch 79 are connected to these switches 80 and 82 in series circuit relationship with the winding for the solenoid 66. A parallel circuit path to ground also exists from the solenoid winding to ground through the normally open switch 64.

To provide vibration free operation of the solenoid, a small direct current solenoid is utilized. The use of a direct current solenoid further reduces any interference with the magnetic information on the tape 16 due to stray magnetic fields. Accordingly, a source of direct current power, shown by the block 86, is connected between ground and the solenoid 66. The circuit as illustrated is in the off position or the hub 54 may be considered as in the "zero" position with the roller $62^a$ within the camming notch $54^a$ to maintain the contacts of switch 62 open.

When the tape apparatus is to be operated the vacuum motor (not shown) for the vacuum columns 18 and 20 is energized and the circuit maintains its at rest condition until the vacuum in the columns builds up to the desired operating amount. Once the vacuum has built up to the appropriate level the sensing means associated therewith will close the switch 82. The closing of the switch 82 is effective to power the motor 52 through the normally closed contacts $79^a$. This circuit can be readily traced from the A.C. source 84 through the motor 52 through the closed contacts $79^a$ and the now closed switch 82 to the ground connection and back to the source 84. The energization of the motor 52 causes the hub 54 to rotate in response thereto. When the hub 54 rotates to the 180 degree position the actuating roller for the switch 64 is actuated by the protruding ends of the links 44 and 46, see FIG. 5; to close the contacts for this switch whereby a circuit is closed through the winding for the solenoid 66. This circuit can be traced from the direct current source 86, through the winding for the solenoid 66, and through the now closed contact for switch 64 to ground and back to the source 86. During this interval the roller $62^a$ has been disengaged from the camming notch $54^a$ whereby the switch contacts $62^b$ and $62^c$ for the switch 62 have also been closed. The contact $62^b$ which may be termed a motor run and stop contact will maintain the motor 52 energized through this now closed contact by providing a direct circuit to ground. This circuit connection is necessary since it is noted that upon the energization of the solenoid 66 the solenoid plunger is positioned whereby the normally closed contact $79^a$ is open while the normally opened contact $79^b$ has been closed. The opening of the contact $79^a$ opens the circuit through which the motor 54 was initially energized. The motor 52 will be maintained energized through approximately one complete rotation to allow the hub 54 to reach the 360 degree or "zero" position. Upon reaching the "zero" position the roller $62^a$ once again engages the camming notch $54^a$ to cause the contacts $62^b$ and $62^c$ to open.

Figure 4:
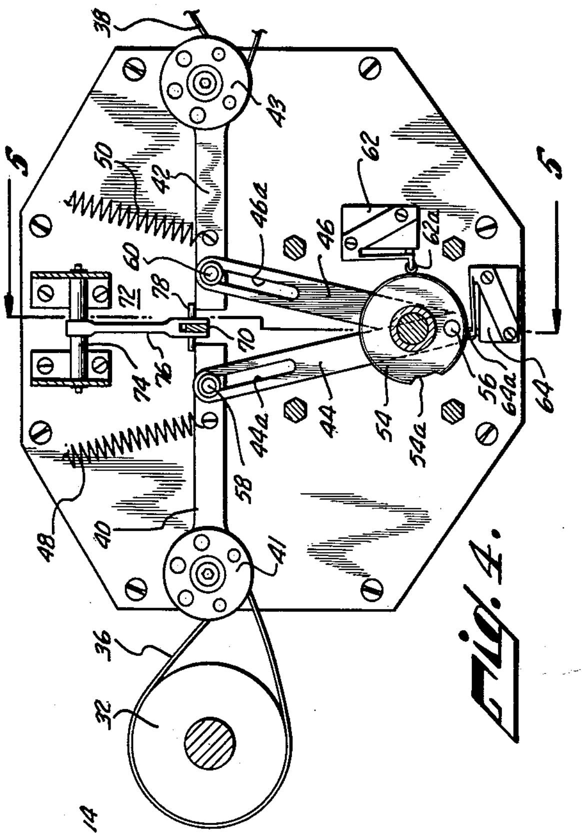
FIG. 4 is a detached, elevational view of the brake with the links shown at the 180 degree position.

The energization of the solenoid 66 in this manner will cause its plunger to place the latch 72 into engagement with the brake arms 40 and 42 in the fashion shown in FIGS. 4 and 6. The latch 72 engages the adjacent ends of the arms 40 and 42 to maintain them in an extended position against the urging of the springs 48 and 50 whereby the brake bands 36 and 38 loosely encircle the brake drums 32 and 34 and thereby free the reels 10 and 12 for rotation. The solenoid contacts $79^b$ lock the solenoid 66 in its energized position through the switch 82 and this extended position of the arms 40 and 42 will maintain the reels 10 and 12 in an operative relationship. When a malfunction is sensed by the sensing means associated with the vacuum columns 18 and 20 the circuit to the solenoid will be opened as a result of the operation of the switch 82 to thereby release the latch 72. The latch 72 moves out of engagement with the brake arms 40 and 42 and under the influence of the stored energy provided by the springs 48 and 50 will quickly pull the arms 40 and 42 to cause the brake bands 36 and 38 to clamp to the drums 32 and 34 in a braking relationship and bring the reels to an immediate halt.

The switch 80 is a manual control for releasing the brake and is arranged to lock out the vacuum sensing circuit when the reels 10 and 12 are loaded or unloaded.

It will now be seen that an improved brake has been provided providing high speed braking action. The brake of this invention has been found to stop the tape reels and associated drive components in less than 150 milliseconds.

What is claimed is:

1. In tape apparatus including, a pair of tape reels mounted to transport tape between same, a pair of vacuum columns adapted to loosely receive the tape transported between the reels, transducing means arranged intermediate the vacuum columns, an individual drive motor coupled to drive each of said reels to wind and unwind tape onto the reel, an individual brake drum rotatably mounted with each of the drive motors, a brake band encircling each of said brake drums and arranged in frictional braking engagement with the brake drums when the tape apparatus is inoperative, control arms connected to the brake bands for actuating the bands into and out of braking relationship with said drums, spring means connected to said control arms for constantly urging the arms whereby the brake bands are placed in a braking relationship, means for latching the control arms out of said braking relationship, a motor coupled to the control arms and operative for actuating said latching means, and circuit means including solenoid means connected to said latching means responsive to a preselected vacuum condition of said vacuum columns to energize said motor for a preselected interval to thereby energize the solenoid means to actuate said latching means whereby the control arms are latched out of braking relationship against the urging of said springs, the solenoid means being arranged in circuit relationship to maintain itself energized, said circuit means being operative upon a change in the preselected vacuum condition to de-energize the solenoid means and thereby release said latching means.

2. In tape apparatus as defined in claim 1 wherein said control arms comprise a pair of braking control arms inter-connected with said brake bands and said springs and a pair of links inter-connecting said braking control arms and said motor means.

3. In tape apparatus as defined in claim 2 wherein said motor includes a hub coupled to be rotatable therewith and mounting said links, switching means arranged adjacent said hub and actuated in response to the rotation thereof to effect the energization of said solenoid means.

4. Tape apparatus comprising, a pair of tape reels mounted to transport tape therebetween, a pair of vacuum columns adapted to loosely receive the tape transported between the reels, transducing means arranged intermediate the vacuum columns, an individual drive motor coupled to drive each of said reels to wind and unwind tape onto said reels, brake drums separately and rotatably coupled to one of said drive motors, a pair of brake bands each separately encircling one of said brake drums and for frictionally engaging said brake drums to thereby stop any rotation thereof, a pair of control arms coupled to said brake bands having a braking position for urging said brake bands into the braking position, said pair of control arms each including a tapered friction surface located adjacent one end thereof, at least one spring bias means coupled to each of said control arms for normally forcing said control arms into the braking position, motor means coupled to each of said control arms for acting against the force of said spring bias means and for moving said control arms out of the braking position, means for latching said control arms out of the braking position, said means for latching comprising a latching arm having one end including means for frictionally engaging the tapered friction surface of each of said control arms, circuit means including electromechanical means connected to said latching arm and responsive to a preselected vacuum of said vacuum columns to energize said motor means for a pre-selected interval thereby energizing said electromechanical means and actuating said latching arm into a latching position whereby said friction surface is engaged to thereby maintain said control arms out of the braking position, said circuit means being connected in circuit relationship to said electromechanical means for selectively maintaining said electromechanical means energized, said circuit means being operative upon the change in the pre-selected vacuum condition for de-energizing said electromechanical means and thereby moving the end of said latching arm out of said latching position to thereby allow said control arms to be placed in the braking position.

5. A fast acting brake comprising at least one rotatable brake drum, rotatable brake band securing means, a brake band connected for frictionally engaging said brake drum for stopping same and connected to said rotatable brake band securing means, a control member connected to said brake band securing means for rotating same and thereby defining a braking and non-braking position in accordance with the position thereof, spring bias means coupled to said control member adjacent the opposite end thereof from the brake band for normally urging said brake band into a braking position, a latching member mounted for engaging the control member adjacent the spring end thereof and movable into and out of engagement therewith to hold the control member in a non-braking and braking position respectively, and control means for actuating said latching member into and out of engagement with the control member.

6. A fast acting brake comprising a pair of rotatable shafts, at least one drive motor coupled to said rotatable shafts for controlling the rotation thereof, a pair of brake drums each individually coupled to one of said rotatable shafts, a pair of brake bands for individually, frictionally engaging one of said brake drums and thereby stop the rotation thereof, a pair of control arms coupled to said brake bands, said pair of control arms each including a tapered friction surface located adjacent to one end thereof and with said ends arranged adjacent one another, at least one spring bias means coupled to each of said control arms for normally urging said control arms into a braking position whereby said brake bands frictionally engage said drums, motor means coupled to each of said control arms for moving said control arms out of said braking position, said motor means including a motor mounting a rotatable hub and a pair of linking members each coupled between said hub and a separate one of said control arms, said motor means being arranged whereby a predetermined rotation of said hub moves said linking members into a position whereby said control arms are placed out of the position for urging said brake bands into said braking position, means for frictionally engaging the tapered friction surface of each of said control arms for latching said arms into a non-braking position, said means for latching further comprising an electromechanical means which is operational in response to electrical power applied thereto for urging said latching arm to a latching position whereby said friction surface is engaged by said latching arm to thereby maintain said control arms in a non-braking position, and switching means coupled to said electromechanical means for selectively applying electrical power thereto, said electromechanical means comprising a solenoid coupled to said latching arm and to said switching means, said switching means being adapted to be actuated by said linking members whereby the rotation of said hub causes the ends of said linking members to actuate said switching means to thereby cause electrical power to be applied to said solenoid and thereby cause said solenoid to move said latching arm into the latching position.

References Cited in the file of this patent

UNITED STATES PATENTS

| | | |
|---|---|---|
| 2,687,882 | Pettus | Aug. 31, 1954 |
| 2,792,217 | Weidenhammer et al. | May 14, 1957 |
| 2,815,907 | McCormick | Dec. 10, 1957 |
| 2,868,470 | Selsted | Jan. 13, 1959 |
| 2,921,753 | Lahti et al. | Jan. 19, 1960 |